United States Patent [19]

Laporte

[11] Patent Number: 5,443,239
[45] Date of Patent: Aug. 22, 1995

[54] SEAT SUPPORT FOR A MOTOR VEHICLE

[75] Inventor: Alain Laporte, Guyancourt, France

[73] Assignee: Regie Nationale des Usines Renault, Boulogne-Billancourt Cedex, France

[21] Appl. No.: 233,806

[22] Filed: Apr. 26, 1994

[30] Foreign Application Priority Data

Apr. 27, 1993 [FR] France .................. 93 04935

[51] Int. Cl.⁶ .................................................. A47B 97/00
[52] U.S. Cl. .............................. 248/503.1; 296/65.1; 297/440.2
[58] Field of Search ................ 296/65.1, 63; 248/503.1, 503, 500, 421, 429; 247/440.22

[56] References Cited

U.S. PATENT DOCUMENTS 3,915,493  10/1975  Brown .

FOREIGN PATENT DOCUMENTS

| | | |
|---|---|---|
| 0143678 | 6/1985 | European Pat. Off. . |
| 0171660 | 2/1986 | European Pat. Off. . |
| 0283356 | 9/1988 | European Pat. Off. . |
| 0442765 | 8/1991 | European Pat. Off. . |
| 0500412 | 8/1992 | European Pat. Off. . |
| 0512931 | 11/1992 | European Pat. Off. . |
| 2500383 | 8/1982 | France . |
| 2556946 | 6/1985 | France . |
| 2008938 | 6/1979 | United Kingdom . |

Primary Examiner—Ramon O. Ramirez
Attorney, Agent, or Firm—Oblon, Spivak, McClelland, Maier & Neustadt

[57] ABSTRACT

A motor vehicle seat support includes a carrier frame on which front forks and rear forks are designed to work respectively with fastening rods that are integral with the floor of the vehicle. Each one of the front and rear forks carries a mobile catch to lock each one of the forks with the corresponding rod, and a device for operating the catches to bring the latter into an unlocked position, so as to make possible the disengagement of the fork in relation to the fastening rods. The front and rear forks are carried by two lower guide rails in contact with upper guide rails braced by a base for holding a seat.

3 Claims, 2 Drawing Sheets

SEAT SUPPORT FOR A MOTOR VEHICLE

BACKGROUND OF THE INVENTION

1. Field of the Invention

The present invention relates to a motor vehicle seat support comprising-a carrier frame on which front forks and rear forks are designed to work respectively with a fastening rod that is integral with the floor of the vehicle. Each one of the front and rear forks carries a mobile catch to lock the fork with the corresponding rod. The present invention further relates to a means for operating the catch to bring the latter into an unlocked position, so as to make possible the disengagement of the forks in relation to the support rods.

2. Discussion of the Related Art

Publication FR-A-2556946 describes a seat in which the catches are carried by feet fastened to the framework of the seat and in which catches are pulled into a locking position by a return means against a control force exerted by a rocking lever.

The present invention springs from the idea of facilitating the longitudinal adjustment of the seat and the interchangeability of the seat without prior modification of the support.

SUMMARY OF THE INVENTION

Accordingly, an object of the present invention is to provide a novel motor vehicle seat support on which the front forks and the rear forks are carried by two lower guide rails in contact with mobile upper guide rails, braced by a base for holding the seat.

The seat support thus produced can be directed either backward or in the direction of advance of the vehicle and can receive either a standard seat, a child passenger seat or a storage module closed by an arm rest.

Accordingly, the present invention relates to a motor vehicle seat support which comprises front forks and rear forks which respectively cooperate with first fastening rods and second fastening rods, the first and second fastening rods being integral with a floor of a vehicle, each one of the front forks and rear forks comprising a vehicle catch for locking each one of the front forks and rear forks to a corresponding one of the first and second fastening rods; means for operating the catches to bring the catches into an unlocked position so as to permit a disengagement of the front forks and rear forks from the first and second fastening rods; first and second lower guide rails which carry the front and rear forks; first and second mobile upper guide rails in contact with the first and second lower guide rails, the first and second mobile upper guide rails being braced by a base for holding a seat and having first and second raised lateral edges; front and rear secondary fastening supports incorporated into the lateral edges; and notches on the secondary supports which are transversely aligned, the notches comprising an opening for permitting an insertion of longitudinally offset crossbars on the seat.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
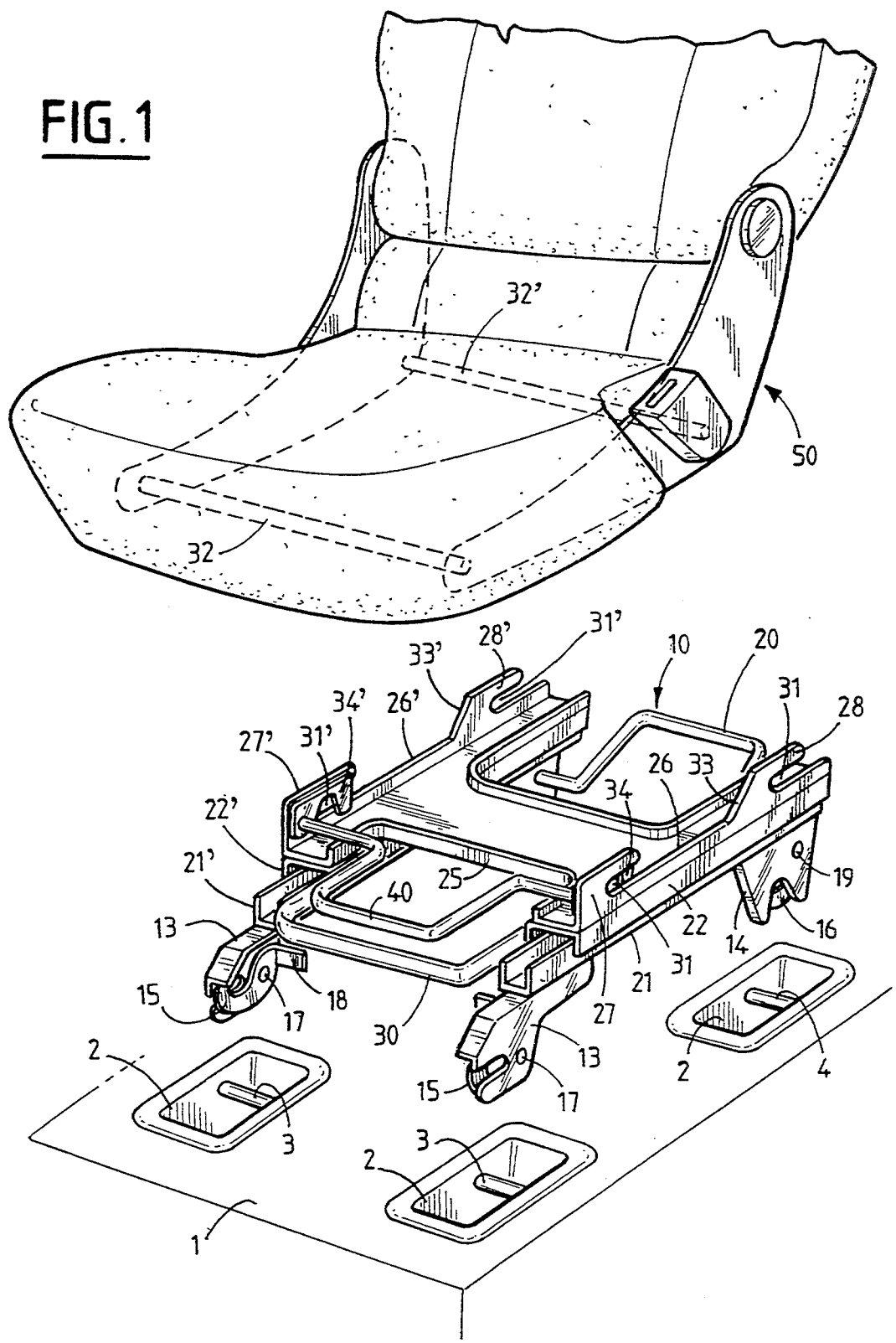
FIG. 1 is a perspective representation of the seat support and of its arrangement in relation to a floor element of a motor vehicle.

Referring now to the drawings wherein like reference numerals designate identical or corresponding parts throughout the several views, and more particularly to FIG. 1 thereof, in FIG. 1, a portion of floor 1 having holes 2 for receiving fastening rods 3, 4 that are rigidly fastened to the floor has been represented. Two rods, such as 3, are thus transversely aligned and longitudinally offset in relation to two transversely aligned rods 4.

The transverse separation of rods 3 or 4 and their longitudinal offsetting is in correspondence with those of front forks 13 and rear forks 14 of support 10 of a seat 50.

Each front fork 13 and each rear fork 14 has a catch. Each catch 15 of front forks 13 is mounted to rotate around a pin 17 transversely aligned with the corresponding pin of the other catch and has a lug 18 for manual operation.

Catches 16 of rear forks 14 are mounted to rotate around transversely aligned pins 19 and are mechanically connected by a first rocking lever 20 for coupling and for operating. Rocking lever 20 thus brings catches 16 simultaneously into an unlocked position so as to make possible the disengagement of forks 14 in relation to support rods 4.

According to a feature of the present invention, front forks 13 and rear forks 14 are carried by the ends of two lower guide rails 21, 21' in contact with upper guide rails 22, 22'.

A second operating rocking lever 30 assures the unlocking of the upper guide rails 22, 22' in relation to the corresponding lower rails 21, 21' to produce a relative displacement of upper rails 22, 22' in relation to lower rails 21, 21' that are immobilized by their forks 13, 14 in contact with rods 3, 4 carried by the floor.

According to a further feature of the present invention, upper rails 22, 22' are braced by a base 25 for holding seat 50.

Base 25 rigidly connected to upper rails 22, 22' is made of a sheet metal blank that is cut and folded and has two raised lateral edges 26, 26' that have front secondary fastening supports 27, 27' and rear secondary fastening supports 28, 28' incorporated into said edges.

Each secondary support such as 27, 27' and 28, 28' have a notch 31, 31' and the notches 31, 31' are transversely aligned at the level of supports 27, 27' and 28, 28'.

Notches 31, 31' transversely aligned, receive under these conditions two mounting crossbars 32, 32' that are carried by seat 50 and longitudinally offset.

To facilitate the mounting of a seat 50, the transversely aligned secondary support 28, 28' are limited by a guide ramp 33, 33' directed toward a rocking catch 34, 34' for the closing of transversely aligned notches 31, 31' carried by secondary supports 27, 27'. Catches 34, 34' are coupled and operated by a third rocking lever 40.

Figure 2:
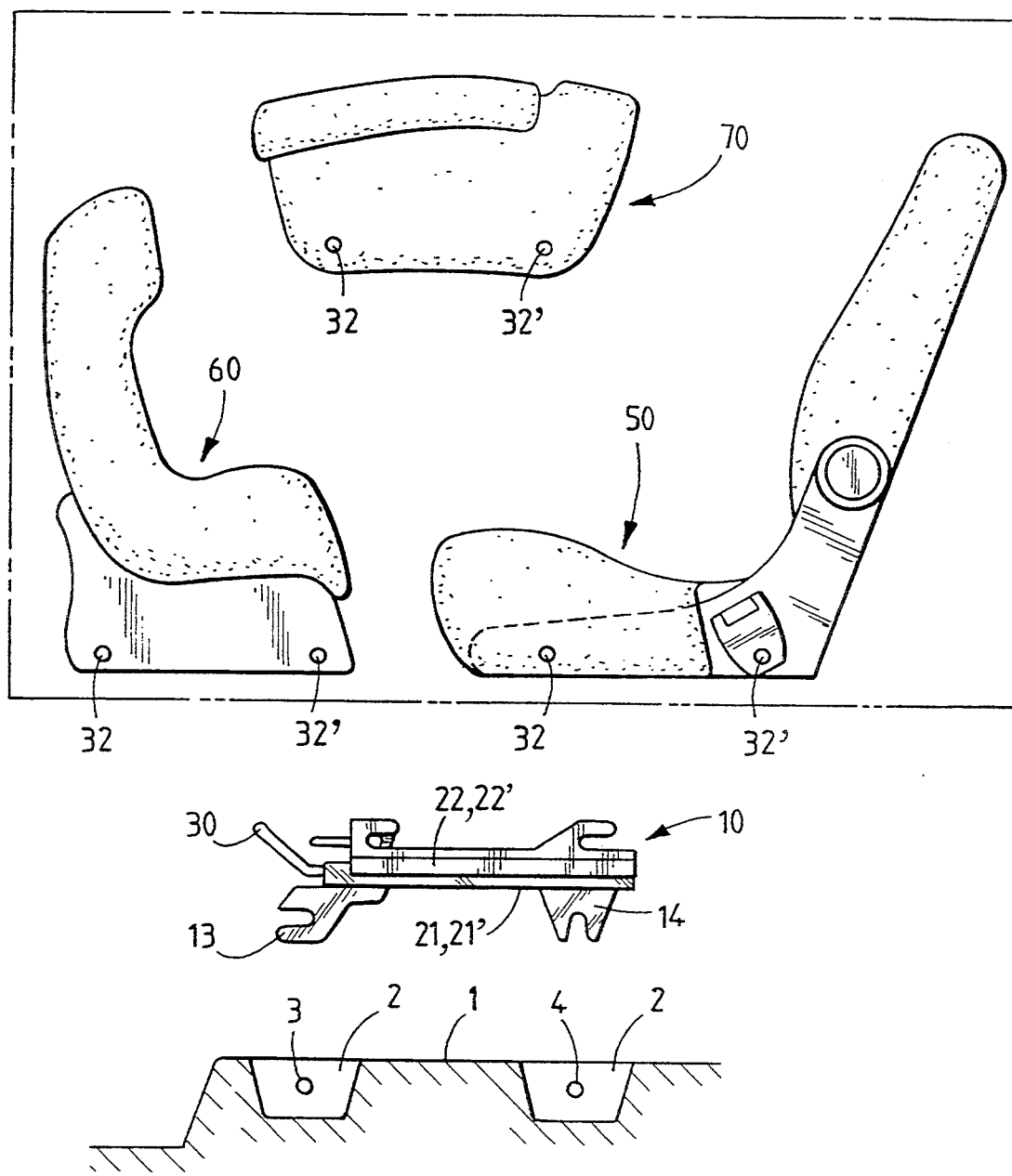
FIG. 2 is a diagrammatic representation of the support represented in FIG. 1 and a set of mounting equipment.

As is shown in FIG. 2, seat 50 carries mounting crossbars 32, 32'. The identical arrangement of crossbars 32, 32' is transposed as desired on a child passenger seat 60 or on a storage module 70 whose cover constitutes an arm rest.

To make possible the various arrangements of the passenger compartment of the vehicle, the arrangement of crossbars 32, 32' and secondary supports 27, 27' and 28, 28' permit a change of orientation of seat 50, seat 60 or module 70.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A motor vehicle seat support comprising:
   front forks and rear forks which respectively cooperate with first fastening rods and second fastening rods, the first and second fastening rods being integral with a floor of a vehicle, each one of said front forks and rear forks comprising a mobile catch for locking each one of said front forks and rear forks to a corresponding one of said first and second fastening rods;
   means for operating said catches to bring said catches into an unlocked position so as to permit a disengagement of said front forks and rear forks from said first and second fastening rods;
   first and second lower guide rails which carry said front and rear forks;
   first and second mobile upper guide rails in contact with said first and second lower guide rails, said first and second mobile upper guide rails being braced by a base for holding a seat and having first and second raised lateral edges;
   front and rear secondary fastening supports incorporated into said lateral edges; and
   notches on said secondary fastening supports which are transversely aligned, said notches comprising an opening for permitting an insertion of longitudinally offset crossbars on said seat.

2. A support according to claim 1, wherein a first set of said secondary fastening supports are transversely aligned and limited by a guide ramp directed toward rocking catches for closing the transversely aligned notches on a second set of said secondary fastening supports which are transversely aligned.

3. A support according to claim 2, further comprising a first rocking lever for coupling and for operating said catches for locking said front forks, a second rocking lever for operating and for unlocking said first and second mobile upper guide rails in relation to said first and second lower rails, and a third rocking lever for coupling and for operating said rocking catches for closing said notches carried by said second set-of said secondary fastening supports.

* * * * *